United States Patent [19]

Vanzo

[11] Patent Number: 5,075,432
[45] Date of Patent: Dec. 24, 1991

[54] SPHERICAL CYCLODEXTRIN POLYMER BEADS

[75] Inventor: Edward Vanzo, 1258 Old Farm Cir., Webster, N.Y. 14580

[73] Assignee: Edward Vanzo, Webster, N.Y.

[21] Appl. No.: 392,296

[22] Filed: Aug. 11, 1989

[51] Int. Cl.$^5$ .............................................. C08B 37/16
[52] U.S. Cl. ........................... 536/103; 260/DIG. 31; 536/106
[58] Field of Search ................................. 264/4.3, 4.7; 427/213.33; 428/402.24; 260/DIG. 31; 424/488; 536/103, 106

[56] References Cited

U.S. PATENT DOCUMENTS

| | | | |
|---|---|---|---|
| 3,420,788 | 1/1969 | Solms | 536/103 X |
| 3,455,838 | 7/1969 | Marotta et al. | 428/402.2 |
| 4,115,534 | 9/1978 | Ithakissios | 424/1.1 |
| 4,274,985 | 1/1981 | Szejtli et al. | 525/54.2 |
| 4,432,802 | 2/1984 | Harata et al. | 264/4.3 X |
| 4,565,764 | 1/1986 | Nakahara et al. | 428/402.2 X |
| 4,772,397 | 9/1988 | Szûcs et al. | 210/502.1 X |
| 4,774,329 | 9/1988 | Friedman | 424/488 X |
| 4,781,858 | 11/1988 | Mizukami et al. | 428/402.24 X |

FOREIGN PATENT DOCUMENTS 2927733 1/1980 Fed. Rep. of Germany .
58-171404 10/1983 Japan .
1244990 9/1971 United Kingdom .

OTHER PUBLICATIONS

*The Condensed Chemical Dictionary,* Eighth Edition, revised by G. G. Hawley, Van Nostrand Reinhold Co., New York, 1971, p. 346.
I. Int. Symp. on Cyclodextrins, Budapest, 1981, Water-Soluble Cyclodextrin Polymers and Their Complexing Properties, pp. 345-356.
Die Starke, No. 5/1969, Properties of Cyclodextrins, pp. 119-123.
Starke/Starch 30 (1978) No. 4, S. 127-131, Cyclodextrinpolymere, Szejtli et al.

*Primary Examiner*—Richard D. Lovering
*Attorney, Agent, or Firm*—Lucas & Just

[57] ABSTRACT

The process entails forming a droplet of water, cyclodextrin and base in a non-polar solvent such as methylisobutylketone using polyvinyl butyral as an emulsifier. A cross-linking agent such as epichlorohydrin is reacted with the cyclodextrin and emulsifying agent to form the spherical polymer bead.

19 Claims, 4 Drawing Sheets

SPHERICAL CYCLODEXTRIN POLYMER BEADS

This invention relates to polymers of cyclodextrin and more specifically to a method for forming cyclodextrin polymer beads.

Cyclodextrins are non-reducing cyclic dextrins which typically have between six (6) to eight (8) anhydroglucose units per molecule. A six membered ring is referred to conventionally as alpha cyclodextrin, a seven membered ring as beta cyclodextrin, and an eight membered ring as gamma cyclodextrin. Cyclodextrins are made by treating a slurry of starch or liquefied starch, DE 1-5, with a cyclodextrin transglycosidase at an appropriate pH and temperature.

Cyclodextrins, modified cyclodextrins and cyclodextrin polymers are known for their ability to form inclusion complexes with other molecules. The cyclodextrin acts as a host to a variety of guest molecules which, at least in part, are able to fit physically inside the ring structure of the cyclodextrin. The inclusion phenomenon is both physical and chemical. Polycyclodextrin beads are, for example, used in chromatographic columns and as a means of removing polychlorinated biphenyl compounds from the environment. See U.S. Pat. No. 4,726,905 dated Feb. 23, 1988.

British Patent Specification 1,244,990 (N. Wiedenhof, J. N. J. J. Lammers and C. L. Van Panthaleon, Die Starke, 21, 119 (1969)) teaches preparing cyclodextrin polymer beads by reacting a polyfunctional compound such as epichlorohydrin with an aqueous droplet of cyclodextrin or mixture of cyclodextrin in a non-polar solvent such as methylisobutylketone where the droplet has been stabilized in the non-polar solvent with a non-ionic detergent. This process, although appearing to be attractive for scale-up operations, has been found not to be able to produce spherical beads on a large scale. See comparative example 1 and 2 and FIGS. 1 and 2.

Japanese Application No. 57/54553 (1982) teaches a two step process of first reacting cyclodextrin with epichlorohydrin to form a soluble cyclodextrin bead and then dispersing the soluble bead in liquid paraffin with epichlorohydrin at a temperature of 40-50° C. to form an insoluble bead of cyclodextrin polymer.

U.S. Pat. No. 4,274,985 teaches forming a copolymer of cyclodextrin and polyvinyl alcohol. Polyvinyl acetate is used as an emulsifying agent.

Applicant has now discovered a commercial, industrial scale method for making spherical polymers of cyclodextrin. The spherical bead produced by the present invention is a three dimensional bead of cross-linked cyclodextrin having a surface substantially free of chemically bonded emulsifying agent.

BRIEF DESCRIPTION OF THE DRAWINGS

FIG. 1 illustrates beads measuring between 20 to 40 mesh by a prior art process;

FIG. 2 illustrates beads measuring under 20 mesh made by a prior art process;

FIG. 3 illustrates beads made in accordance with the present invention, Example 1, measuring between 20 and 40 mesh;

FIG. 4 illustrates beads made in accordance with the present invention, Example 1, measuring between 40 and 60 mesh;

FIG. 5 illustrates beads made in accordance with the present invention, Example 5, measuring between 20 and 40 mesh;

FIG. 6 illustrates beads made in accordance with the present invention, Example 5, measuring between 40 and 60 mesh; and FIG. 7 illustrates beads made in accordance with the present invention, Example 5, measuring between 100 and 200 mesh.

Figure 1:
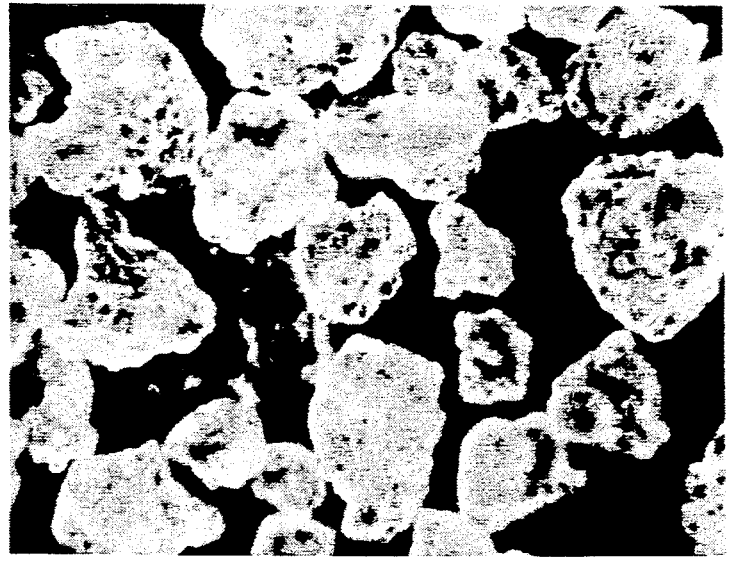
FIGS. 1 and 2 illustrate beads of cyclodextrin polymers made in accordance with the prior art.

Broadly, the process of the present invention comprises forming an emulsion of droplets of polar solvent having a cyclodextrin therein and surrounded at least in part by an emulsifying agent polyvinyl butyral in a non-polar solvent and adding a cross-linking agent to the non-polar solvent such that the cross-linking agent reacts with the cyclodextrin to form a spherical bead of cyclodextrin. Subsequently, a spherical bead of cyclodextrin is recovered from the non-polar solvent.

Forming a droplet of polar solvent having cyclodextrin therein surrounded at least in part by an emulsifying agent polyvinyl butyral in a non-polar solvent is preferably accomplished by mixing the cyclodextrin with the polar solvent, adding the emulsifying agent to the non-polar solvent and stirring the mixture of polar solvent and cyclodextrin into the non-polar solvent and emulsifying agent. Alternatively, the polar solvent and cyclodextrin mixture is added to the non-polar solvent and then the emulsifying agent is added and mixed into the non-polar solvent.

The cross-linking agent is added to the non-polar solvent by stirring it into the solvent.

To react the cyclodextrin with the cross-linking agent the reaction vessel is maintained at ambient pressure and preferably elevated temperature between about 50° to about 90° C. Good results have been obtained at about 80° C.

Recovery of the cyclodextrin bead is accomplished in a conventional manner such as filtration. Typically the beads settle to the bottom of the reaction vessel.

The reaction vessel should be equipped with a stirrer to maintain the droplets of polar solvent suspended in the non-polar solvent. The speed of the paddle appears to have an effect on the size of the droplets. Fast speeds produce smaller droplets and thus smaller beads while slower speeds produce larger droplets and larger beads.

Preferably the reaction vessel is equipped with a condenser.

Suitable non-polar solvents for the process of the present invention include methylisobutylketone (MIBK), o-xylene and toluene. Good results have been obtained using MIBK.

Suitable polar solvents for use in the present invention include water and aqueous alkali metal hydroxide solutions such as aqueous sodium hydroxide solutions. Good results have been obtained with water and aqueous sodium hydroxide solutions. The polar solvent should be immiscible or substantially immiscible in the non-polar solvent and must be able to dissolve the cyclodextrin or mixture of cyclodextrin to a sufficient extent.

If water is used, a base must be added to the droplet. The base helps to solubilize as well as act as a catalyst for the reaction. Suitable bases for the present invention include sodium hydroxide, sodium bicarbonate and lithium hydroxide. Good results have been obtained with sodium hydroxide.

The emulsifying agent is polyvinyl butyral. Good results have been obtained with polyvinyl butyral having a molecular weight of between about 100,000 to 150,000 and a hydroxy content of about 19%.

The term cyclodextrin means cyclodextrin such as alpha, beta or gamma cyclodextrin or mixture of cyclodextrins of two or more of these cyclodextrins. The term also includes branch cyclodextrins. It is preferred that the cyclodextrin or mixture of cyclodextrin be as pure as possible to avoid contamination in the bead.

Suitable cross-linking agents include epichlorohydrin, formaldehyde, diepoxybutane and phosphoroxy chloride. Good results have been obtained with epichlorohydrin.

The solids level of cyclodextrin in the polar solvent can range between about 1% to about 40% by weight. Good results have been obtained using a solid level of about 25% to about 30% in the slurry.

The amount of base in the polar phase will vary depending on the amount of cyclodextrin present Good results have been obtained with sodium hydroxide in an amount of about 12% to 20% by weight in the solution The amount of emulsifying agent that is used depends on the amount of cyclodextrin and the amount of polar solvent in non-polar solvent Preferably the ratio of emulsifying agent to non-polar solvent is about 0.5 g of emulsifying agent to 1 liter of non-polar solvent to 20g of emulsifying agent to 1 liter of non-polar solvent i.e. about 0.5 g/1 to about 20 g/1 More preferably, the ratio of emulsifying agent to non-polar solvent is about 3.0 g/1 to about 0.75 g/1. Good results have been obtained with a ratio of 1 g/1.

These and other aspects of the present invention may be more fully understood by reference to the following examples.

Comparative Example 1

This example illustrates making a bead of cyclodextrin using a process as disclosed by Wiedenhof and his coworkers in 1969 as disclosed in Die Starke supra, at 120.

Into a twenty-two liter reaction vessel, twenty-five pounds (11.4 kg) of MIBK was added and heated to 80° C. In a separate vessel a slurry of cyclodextrin was prepared by stirring 360 g of beta cyclodextrin with 400 g of water with 0.8 g of sodium borohydride ($NaBH_4$). The cyclodextrin slurry was stirred until uniform and then 640 g of a 30% sodium hydroxide (NaOH) solution was added and the mixture stirred until it dissolved. When the MIBK reached 80° C., 80 ml of Nonident P40, a non-ionic detergent (sold by Shell) was stirred in for about 2 minutes.

Then the slurry of cyclodextrin was added to the MIBK and stirred at about 140 to 150 rpm for 5 minutes.

Next, 1,000 g of epichlorohydrin was added and the stirring rate dropped to 100 rpm. After 5 hours, the reaction vessel was allowed to cool and the MIBK was decanted and the beads recovered, washed and observed under a microscope.

Figure 2:
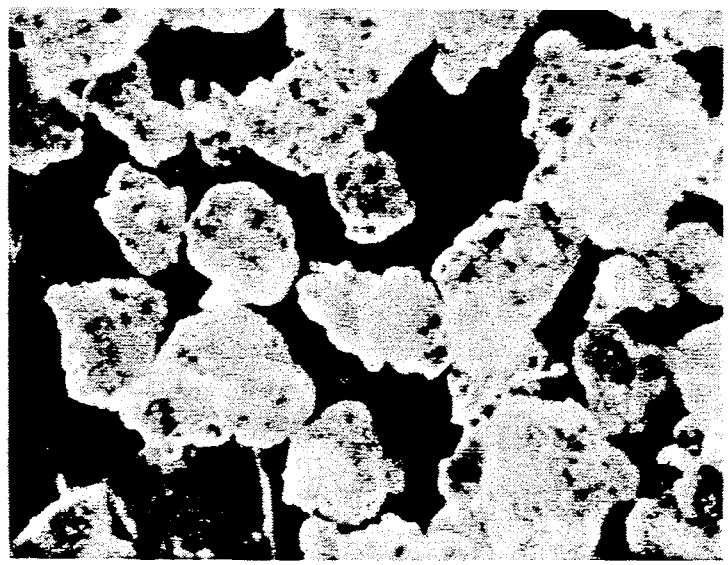

FIG. 1 and 2 are photographs of the two different sizes of the beads recovered from this reaction. FIG. 1 illustrates beads measuring between 20 to 40 mesh size and FIG. 2 illustrates beads measuring under 20 mesh.

As can be seen by FIG. 1 and 2 the beads are non-spherical.

Comparative Example 2

The procedure as outlined in Comparative Example 1 was repeated except a lower stirring rate of 120 rpm was used before the addition of the epichlorohydrin followed by a stir rate of 80 rpm after the addition of the epichlorohydrin. Again, non-spherical beads were produced.

These two comparative examples illustrate that the prior art does not produce spherical beads.

EXAMPLE 1

This example illustrates making a cyclodextrin polymer bead in accordance with the present invention.

Into a 3 liter reaction vessel equipped with a stirrer blade, 2 liters (1,540 g) of MIBK was added and heated to 80° C. in a water bath. The top of the reaction vessel was covered with a condenser and the stirring blade was run at about 300 rpm. To this reaction vessel 6 g of polyvinyl butyral having a hydroxyl content of about 19% and a molecular weight of about 125,000 was stirred in and dissolved. This polyvinyl butyral is sold under the tradename Butvar B-74 by Monsanto Plastics and Resin Co.

In another vessel a slurry is prepared by mixing 49 g of beta cyclodextrin, 54.5 g of water and then adding 87.3 g of a 30% NaOH solution. The stirring is continued until the solution is murky but transparent.

Then the cyclodextrin slurry is added to the reaction vessel containing the MIBK and polyvinyl butyral. After 5 minutes of stirring, 136 g of epichlorohydrin is added and stirring continued at 300 rpm. During the reaction the temperature is maintained to 80° C.

After 4 hours the particles are recovered and washed and observed under a microscope. They had a particle size ranging between 30 $\mu$ to 170$\mu$m in diameter.

For comparison purposes the components used in the reaction as well as some of the reaction conditions are summarized below:

| Component | Amount (grams) |
| --- | --- |
| MIBK | 1,540 (2 L) |
| Polyvinyl butyral | 6 |
| Beta cyclodextrin | 49 |
| Water | 54.5 |
| 30% NaOH | 87.3 |
| Epichlorohydrin | 136 |

Figure 3:
FIGS. 3-7 illustrates beads of cyclodextrin polymers made in accordance with the present invention.
Figure 4:

FIG. 3 illustrates cyclodextrin polymer beads made by this example having a mesh size between 20 to 40. FIG. 4 illustrates cyclodextrin polymer beads made by this example having a mesh size between 40 to 60.

A comparison of FIG. 2 to FIG. 3 illustrates that the present invention produces spherical beads far superior to that of the prior

EXAMPLE 2

The procedure in Example 1 was repeated except the proportion of the components was as follows:

| Components | Amount (grams) |
| --- | --- |
| MIBK | 1,540 (2 L) |
| Polyvinyl butyral | 5 |
| Beta cyclodextrin | 100 |
| Water | 110 |
| 30% NaOH | 175 |

-continued

| Components | Amount (grams) |
|---|---|
| Epichlorohydrin | 272 |

Here the cyclodextrin polymer beads were spherical and ranged in size from 50 $\mu$ to 250 $\mu$ in diameter.

EXAMPLE 3

The procedure in Example 1 was repeated except the reaction was allowed to run 6 hours instead of 4 and the proportion of the components was as follows:

| Component | Amount (grams) |
|---|---|
| MIBK | 1,540 (2 L) |
| Polyvinyl butyral | 5 |
| Beta cyclodextrin | 100 |
| Water | 110 |
| 30% NaOH | 175 |
| Epichlorohydrin | 272 |

The beads produced by this example were harder and more durable than the beads produced by the shorter reaction of 4 hours.

EXAMPLE 4

The procedure in Example 1 was employed except the paddle was run at 250 rpm, the reaction time was 5 hours and a lower ratio of polyvinyl butyral to MIBK was employed. The components for this reaction were as follows:

| Components | Amount (grams) |
|---|---|
| MIBK | 1,540 (2 L) |
| Polyvinyl butyral | 4 |
| Beta cyclodextrin | 100 |
| Water | 110 |
| 30% NaOH | 175 |
| Epichlorohydrin | 272 |

The beads produced were spherical and measured about 10 $\mu$ to 250 $\mu$ in diameter.

EXAMPLE 5

This example used the procedure of Example 1 with a lower ratio of polyvinyl butyral to MIBK, a reaction time of 5 hours instead of 4 hours and a paddle speed of 250 rpm. The components were as follows:

| Components | Amount (grams) |
|---|---|
| MIBK | 1,540 (2 L) |
| Polyvinyl butyral | 3 |
| Beta cyclodextrin | 100 |
| Water | 110 |
| 30% NaOH | 175 |
| Epichlorohydrin | 272 |

Figure 5:
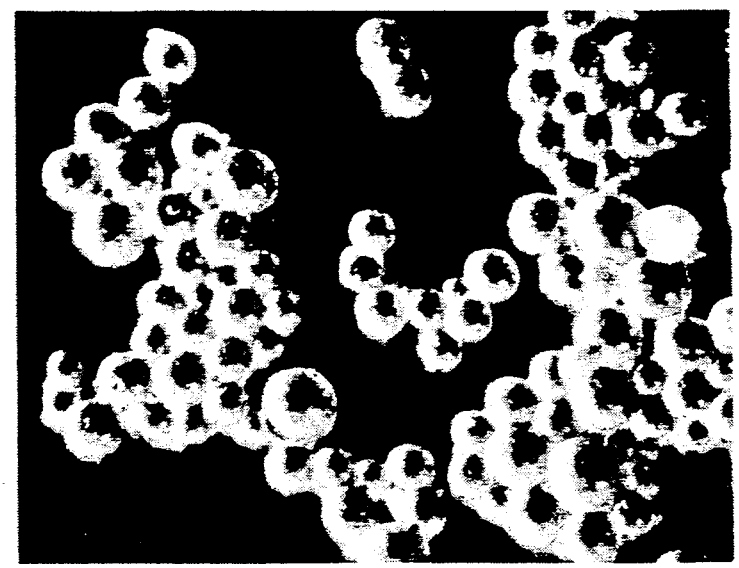
Figure 6:
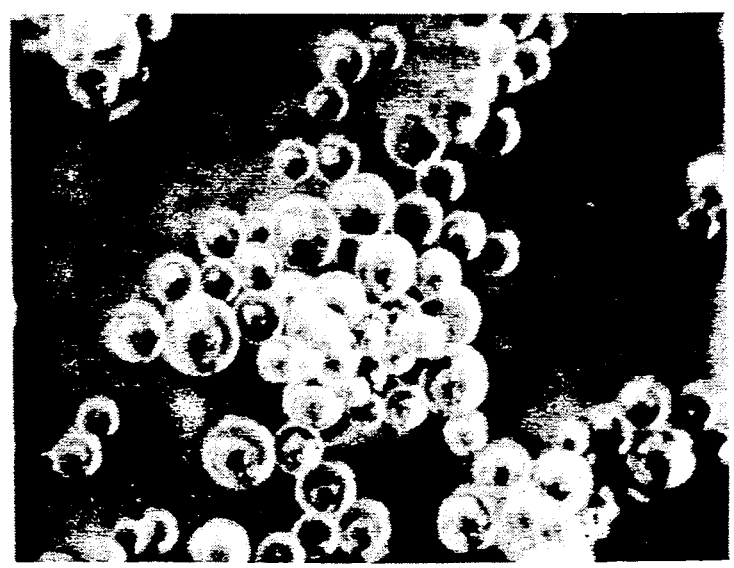
Figure 7:
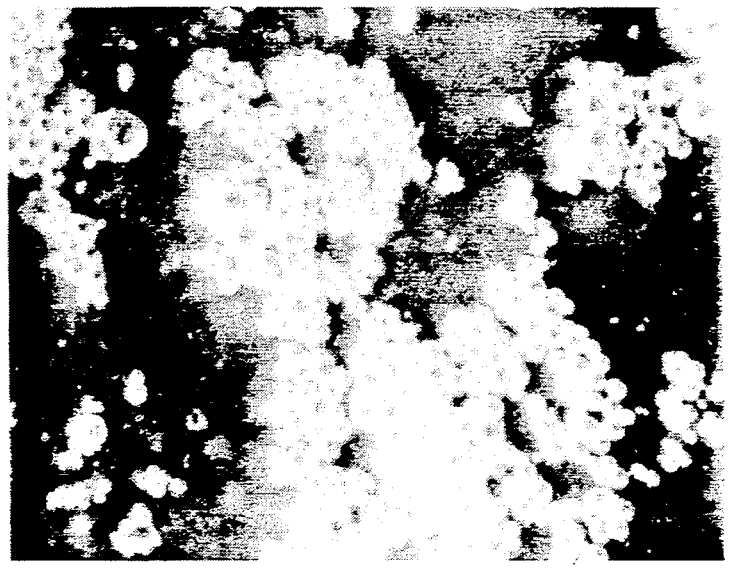

30% NaOH 175
Epichlorohydrin 272 FIG. 5 illustrates the beads made by the example that had a mesh size between 20 and 40. FIG. 6 illustrates beads made by this example having a mesh size between 40 and 60 and FIG. 7 illustrates beads made by this example with beads having a mesh size between 100 to 200. Clearly, the beads of the present invention are very spherical.

EXAMPLE 6

This example illustrates using a larger reaction vessel, 22L instead of 3L and adding the cyclodextrin slurry to the MIBK prior to adding the polyvinyl butyral. This reverse of the addition of the cyclodextrin slurry and polyvinyl butyral did not affect the product. The contents in the reaction vessel were as follows:

| Components | Amount (grams) |
|---|---|
| MIBK | 11,000 (14 L) |
| Polyvinyl butyral | 14 |
| Beta cyclodextrin | 1,440 |
| Water | 1,584 |
| 30% NaOH | 2,540 |
| Epichlorohydrin | 3,915 |

The procedure employed in Example 1 was employed except for the change noted above. In using this larger scale reaction vessel and increased amount of components, the epichlorohydrin should be added slowly since the reaction appears to be exothermic.

EXAMPLE 7

This example illustrates the present invention in a large scale production process using a reaction vessel measuring 72 liters. This is an increase (scale up) of about 35 times. The procedure employed was that of Example 1 except the epichlorohydrin was added in equal proportions over time. The amounts of components used in this example were as follows:

| Components | Amount (grams) |
|---|---|
| MIBK | 26,200 (32.75 L) |
| Polyvinyl butyral | 30 |
| Beta cyclodextrin | 3,400 |
| Water | 6,100 |
| 50% NaOH | 3,600 |
| Epichlorohydrin | 7,000 |

The reaction vessel was maintained at 75° C. The epichlorohydrin was added in 1,000g increments over a half hour period. The reaction was allowed to run over 22 hours. The beads were filtered off and washed with acetone and water. The beads were spherical and had a particle size of about 100$\mu$ to 500$\mu$.

Polyvinyl formal can be used in place of polyvinyl butyral.

It will be understood that the claims are intended to cover all changes and modifications of the preferred embodiments of the invention, herein chosen for the purpose of illustration, which do not constitute a departure from the spirit and scope of the invention.

What is claimed is:

1. A process for making spherical cyclodextrin polymer beads comprising the steps of:
   (a) forming an emulsion of droplets of polar solvent and cyclodextrin surrounded at least in part by an emulsifying agent polyvinyl butyral in a non-polar solvent;
   (b) adding a cross-linking agent to said non-polar solvent and reacting said cross-linking agent with said cyclodextrin to form a spherical cyclodextrin polymer; and
   (c) recovering said spherical cyclodextrin polymer which is substantially free of said polyvinyl butyral.

2. The process of claim 1 wherein said non-polar solvent is methylisobutylketone, said polar solvent is aqueous sodium hydroxide solution and said cross-linking agent is epichlorohydrin.

3. The process of claim 1 wherein said non-polar solvent is selected from the group consisting of methylisobutylketone, o-xylene and toluene.

4. The process of claim 3 wherein said polar solvent is water to which a base has been added to act as a catalyst, said base selected from the group consisting of sodium hydroxide, sodium bicarbonate, and lithium hydroxide.

5. The process of claim 4 wherein said cross-linking agent is selected from the group consisting of epichlorohydrin, formaldehyde, diepoxybutane and phosphoroxy chloride.

6. The process of claim 5 wherein said polyvinyl butyral has a molecular weight of about 100,000 to about 150,000 and a hydroxyl content of about 19%.

7. The process of claim 1 wherein said polar solvent is an aqueous alkali metal hydroxide solution.

8. The process of claim 1 wherein said polar solvent is water to which a base has been added to act as a catalyst, said base being selected from the group consisting of sodium hydroxide, sodium bicarbonate and lithium hydroxide.

9. The process of claim 1 wherein the cross-linking agent is selected from the group consisting of epichlorohydrin, formaldehyde, diepoxybutane and phosphoroxychloride.

10. The process of claim 1 wherein said polyvinyl butyral has a molecular weight about 100,000 to about 150,000 and a hydroxyl content of about 19%.

11. The process of claim 1 wherein forming the emulsion comprises the steps of:

(a$_1$) first, mixing the cyclodextrin with the polar solvent;

(a$_2$) then, mixing the emulsifying agent polyvinyl butyral into the mix of cyclodextrin and polar solvent; and (a$_3$) finally, stirring in the non-polar solvent to the mix of emulsifying agent, cyclodextrin and polar solvent to form said emulsion.

12. The process of claim 1 wherein forming said emulsion comprises the steps of:

(a$_1$) first, mixing the cyclodextrin with the polar solvent;

(a$_2$) then, mixing the non-polar solvent into the mix of cyclodextrin and polar solvent; and (a$_3$) finally, mixing the emulsifying agent polyvinyl butyral into the mix of cyclodextrin, polar solvent and non-polar solvent to form said emulsion.

13. The process of claim 1 wherein the step of reacting the cross-linking agent with the cyclodextrin is conducted at a temperature of about 50° to about 90° C. while constantly stirring.

14. A spherical cyclodextrin polymer made by a process comprising the steps of:

(a) forming an emulsion of droplets of polar solvent and cyclodextrin surrounded at least in part by an emulsifying agent polyvinyl butyral in a non-polar solvent;

(b) adding a cross-linking agent to said non-polar solvent and reacting said cross-linking agent with said cyclodextrin to form a spherical cyclodextrin polymer; and (c) recovering said spherical cyclodextrin polymer which is substantially free of said polyvinyl butyral wherein said spherical cyclodextrin polymer is a cross-linked 3-dimensional matrix of cyclodextrin substantially free of emulsifying agent polyvinyl butyral.

15. The spherical cyclodextrin polymer of claim 14 wherein said non-polar solvent is selected from the group consisting of methylisobutylketone, o-xylene and toluene.

16. The spherical cyclodextrin polymer of claim 15 wherein said polar solvent is water to which a base has been added to act as a catalyst, said base selected from the group consisting of sodium hydroxide, sodium bicarbonate and lithium hydroxide.

17. The spherical cyclodextrin polymer of claim 16 wherein said cross-linking agent is selected from the group consisting of epichlorohydrin, formaldehyde, diepoxybutane and phosphoroxy chloride.

18. The spherical cyclodextrin polymer of claim 17 wherein said polyvinyl butyral has a molecular weight of about 100,000 to about 150,000 and a hydroxyl content of about 19%.

19. The spherical cyclodextrin polymer of claim 18 wherein the cyclodextrin is beta-cyclodextrin.

* * * * *